US012577142B2

(12) United States Patent
Kong et al.

(10) Patent No.: US 12,577,142 B2
(45) Date of Patent: Mar. 17, 2026

(54) HEAT CHAMFERING APPARATUS AND METHOD

(71) Applicant: Corning Incorporated, Corning, NY (US)

(72) Inventors: Bokyung Kong, Hwasung (KR); JooYoung Lee, Asan-si (KR); Byoung Hoon Moon, Seoul (KR); Kwangje Woo, Suwon-si (KR)

(73) Assignee: CORNING INCORPORATED, Corning, NY (US)

( * ) Notice: Subject to any disclaimer, the term of this patent is extended or adjusted under 35 U.S.C. 154(b) by 213 days.

(21) Appl. No.: 18/286,173

(22) PCT Filed: Apr. 8, 2022

(86) PCT No.: PCT/US2022/023978
§ 371 (c)(1),
(2) Date: Oct. 9, 2023

(87) PCT Pub. No.: WO2022/221132
PCT Pub. Date: Oct. 20, 2022

(65) Prior Publication Data
US 2024/0375990 A1 Nov. 14, 2024

(30) Foreign Application Priority Data
Apr. 14, 2021 (KR) ........................ 10-2021-0048573

(51) Int. Cl.
*C03B 33/10* (2006.01)
*C03B 33/09* (2006.01)

(52) U.S. Cl.
CPC ............ *C03B 33/105* (2013.01); *C03B 33/09* (2013.01)

(58) Field of Classification Search
CPC .......... C03B 33/09; C03B 3/282; B26D 3/282
See application file for complete search history.

(56) References Cited

U.S. PATENT DOCUMENTS

| | | | |
|---|---|---|---|
| 3,215,345 A | 11/1965 | Ferguson | |
| 2012/0055905 A1* | 3/2012 | Schmidt | B23H 9/02 |
| | | | 219/121.11 |

(Continued)

FOREIGN PATENT DOCUMENTS

| | | | | |
|---|---|---|---|---|
| JP | 2001139337 A | * | 5/2001 | ............. C03B 33/10 |
| KR | 10-2015-0144534 A | | 12/2015 | |

(Continued)

OTHER PUBLICATIONS

WO-2015178647-A1 EPO Machine Translation retrieved Sep. 18, 2025. (Year: 2025).*

(Continued)

*Primary Examiner* — Lisa L Herring

(57) ABSTRACT
A heat chamfering method for a glass panel includes bringing a heater into contact with an edge of a glass panel by causing the heater to approach a chamfering start point, heat-chamfering the edge by moving the heater from the chamfering start point to a chamfering end point along a chamfering line, and bringing the heater into non-contact with the glass panel by causing the heater to depart from the chamfering end point. The heat-chamfering may include maintaining contact pressure between the heater moving along the chamfering line and the glass panel within a predetermined range of change. In the approaching, an angle defined by a chamfering start point approach line and the chamfering line at the chamfering start point ranges from 155° to 175°. In the departure, an angle defined by the chamfering line and a chamfering end point departure line ranges from 155° to 175°.

13 Claims, 3 Drawing Sheets

(56) References Cited

U.S. PATENT DOCUMENTS

| 2012/0196093 | A1 | | 8/2012 | Van Vlassenrode et al. |
|---|---|---|---|---|
| 2015/0259237 | A1 | | 9/2015 | Kwon et al. |
| 2018/0057399 | A1 | | 3/2018 | Harada et al. |
| 2020/0230774 | A1 | * | 7/2020 | Lee .................. C03B 37/01228 |
| 2021/0101245 | A1 | | 4/2021 | Han et al. |

FOREIGN PATENT DOCUMENTS

| TW | I661901 B | 6/2019 | |
|---|---|---|---|
| WO | WO-2015178647 A1 * | 11/2015 | ................ B26F 3/08 |

OTHER PUBLICATIONS

JP-2001139337-A Machine Translation by Clarivate Analytics retrieved Sep. 20, 2025. (Year: 2025).*

KR20150144534A EPO Machine Translation retrieved Sep. 19, 2025. (Year: 2025).*

Extended European search report, EP application No. 22788679.3, dated Feb. 7, 2025, 6 pages, European Patent Office.

International Search Report and Written Opinion of the International Searching Authority; PCT/US2022/023978; dated Jun. 30, 2022; 14 pages; US Patent Office.

* cited by examiner

【FIG. 3】
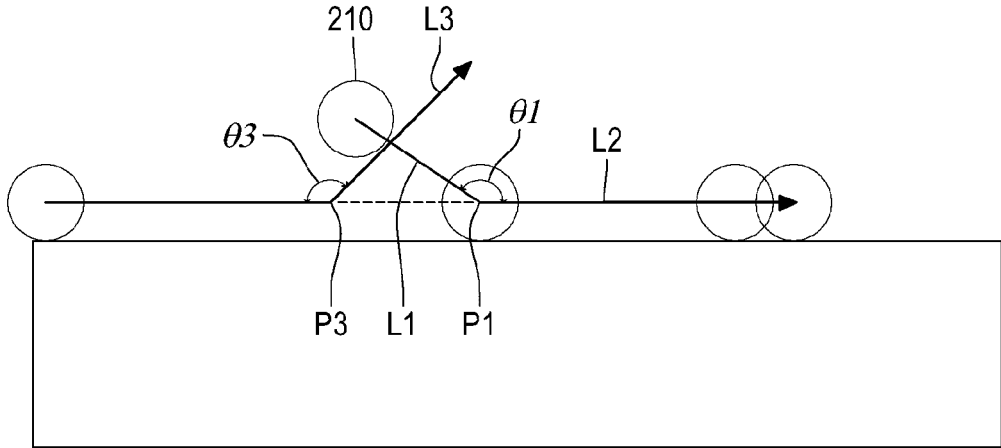
【FIG. 4】
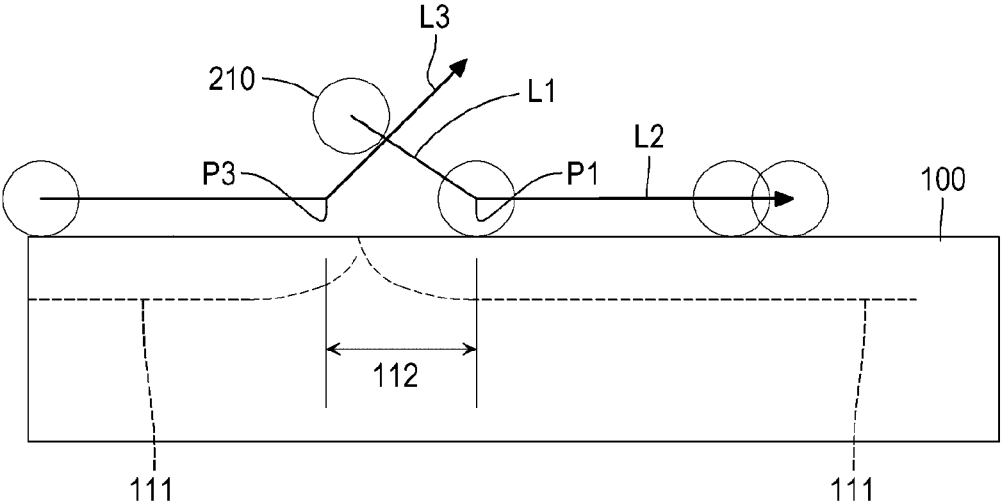

HEAT CHAMFERING APPARATUS AND METHOD

CROSS-REFERENCE TO RELATED APPLICATIONS

This application claims the benefit of priority under 35 U.S.C. § 371 of International Application No. PCT/US2022/023978, filed on Apr. 8, 2022, which claims the benefit of priority under 35 U.S.C. § 119 of Korean Patent Application Serial No. 10-2021-0048573 filed on Apr. 14, 2021, the content of which are relied upon and incorporated herein by reference in their entirety.

BACKGROUND

Field

The present disclosure relates to a heat chamfering apparatus and method and, more particularly, to a heat chamfering apparatus for heat-chamfering an edge of a glass panel by moving a hot body along a chamfering line while maintaining the hot body in contact with the edge of the glass panel and a heat chamfering method using the same.

Description of Related Art

An edge defect of a glass panel is a main factor in damage to the glass panel and reduces the reliability of the glass panel. In particular, a flexible device including a thin glass panel requires reliable bending performance. In such flexible devices, the importance of the removal of an edge defect is increasing.

Edge finishing is performed in order to improve the edge strength of a glass panel. From among such edge finishing technologies, a heat chamfering technology is known. Heat chamfering is suitable for use with thin glass panels vulnerable to external mechanical force. In addition, heat chamfering may provide superior edge strength without causing particles, thereby providing satisfactory bending performance.

SUMMARY

Various aspects of the present disclosure provide a heat chamfering process able to obtain a high yield while being reliable and accurate.

According to an aspect, provided is a heat chamfering method for a glass panel. The method may include: bringing a heater into contact with an edge of a glass panel by causing the heater to approach a chamfering start point by relative movement between the heater and the glass panel; heat-chamfering the edge of the glass panel by applying thermal shock thereto while causing the heater to move from the chamfering start point to a chamfering end point along a chamfering line by relative movement between the heater and the glass panel; and bringing the heater into non-contact with the glass panel by causing the heater to depart from the chamfering end point by relative movement between the heater and the glass panel. The heat-chamfering may include controlling a relative position between the glass panel and the heater such that contact pressure between the glass panel and the heater is maintained during the relative movement between the heater and the glass panel along the chamfering line.

According to another aspect, provided is a heat chamfering method for a glass panel. The method may include:

bringing a heater into contact with an edge of a glass panel by causing the heater to approach a chamfering start point by relative movement between the heater and the glass panel; heat-chamfering the edge of the glass panel by applying thermal shock thereto while causing the heater to move from the chamfering start point to a chamfering end point along a chamfering line by relative movement between the heater and the glass panel; and bringing the heater into non-contact with the glass panel by causing the heater to depart from the chamfering end point by relative movement between the heater and the glass panel. The heater may approach the chamfering start point such that an angle defined by an approach line, along which the heater approaches the chamfering start point, and the chamfering line at the chamfering start point ranges from 155° to 175°. The heater may depart from the chamfering end point such that an angle defined by the chamfering line and a departure line, along which the heater departs from the chamfering end point, ranges from 155° to 175°.

According to another aspect, provided is a heat chamfering method for a glass panel. The method may include: bringing a heater into contact with an edge of a glass panel by causing the heater to approach a chamfering start point by relative movement between the heater and the glass panel; heat-chamfering the edge of the glass panel by applying thermal shock thereto while causing the heater to move from the chamfering start point to a chamfering end point along a chamfering line by relative movement between the heater and the glass panel; and bringing the heater into non-contact with the glass panel by causing the heater to depart from the chamfering end point before the heater returns to the chamfering start point by relative movement between the heater and the glass panel. The distance between the chamfering end point and the chamfering start point may range from 1 mm to 3 mm.

According to another aspect, provided is a heat chamfering apparatus including: a support unit configured to support a glass panel; a heater configured to heat-chamfer an edge of the glass panel by contact with the edge of the glass panel; and a control unit. The control unit may perform: relatively moving the heater and the glass panel such that the heater approaches a chamfering start point to come into contact with the edge of the glass panel; relatively moving the heater and the glass panel such that the heater heat-chamfers the edge of the glass panel by applying thermal shock thereto while moving from the chamfering start point to a chamfering end point along a chamfering line; and relatively moving the heater and the glass panel such that the heater departs from the chamfering end point, thereby coming into non-contact with the glass panel. The control unit may control a relative position between the glass panel and the heater such that a contact pressure between the heater and the glass panel is maintained while the heater is being moved from the chamfering start point to the chamfering end point along the chamfering line.

According to another aspect, provided is a heat chamfering apparatus for a glass panel. The heat chamfering apparatus may include: a support unit configured to support a glass panel; a heater configured to heat-chamfer an edge of the glass panel by contact with the edge of the glass panel; and a control unit. The control unit may perform: relatively moving the heater and the glass panel such that the heater approaches a chamfering start point along an approach line to come into contact with the edge of the glass panel; relatively moving the heater and the glass panel such that the heater heat-chamfers the edge of the glass panel by applying thermal shock thereto while moving from the chamfering start point to a chamfering end point along a chamfering line; and relatively moving the heater and the glass panel such that the heater departs from the chamfering end point along a departure line, thereby coming into non-contact with the glass panel. The control unit may control: the heater to approach the chamfering start point such that an angle defined by the approach line and the chamfering line at the chamfering start point ranges from 155° to 175°, and the heater to depart from the chamfering end point such that an angle defined by the chamfering line and the departure line ranges from 155° to 175°.

According to another aspect, provided is a heat chamfering apparatus for a glass panel. The heat chamfering apparatus may include: a support unit configured to support a glass panel; a heater configured to heat-chamfer an edge of the glass panel by contact with the edge of the glass panel; and a control unit. The control unit may control: the heater and the glass panel to relatively move such that the heater approaches a chamfering start point to come into contact with the edge of the glass panel; the heater and the glass panel to relatively move such that the heater heat-chamfers the edge of the glass panel by applying thermal shock thereto while moving from the chamfering start point to a chamfering end point along a chamfering line; and the heater and the glass panel to relatively move such that the heater departs from the chamfering end point, thereby coming into non-contact with the glass panel, before the heater returns to the chamfering start point. The distance between the chamfering end point and the chamfering start point may range from 1 mm to 3 mm.

As set forth above, the present disclosure may provide a reliable and accurate heat chamfering process.

Accordingly, the heat chamfering process may improve processing efficiency and reduce processing time, thereby obtaining a high yield.

The methods and apparatuses of the present disclosure have other features and advantages that will be apparent from or that are set forth in greater detail in the accompanying drawings, the disclosures of which are incorporated herein, and in the following Detailed Description, which together serve to explain certain principles of the present disclosure.

DESCRIPTION OF THE DRAWINGS

FIG. 3 is a view illustrating an approach angle at which the heater approaches a glass panel and a departure angle at which the heater is separated from the glass panel;

FIGS. 4 and 5 are views illustrating a gap between the chamfering end point and the chamfering start point.

DETAILED DESCRIPTION

Embodiments of the present disclosure will be described in detail with reference to the accompanying drawings.

Figures 1, 2:
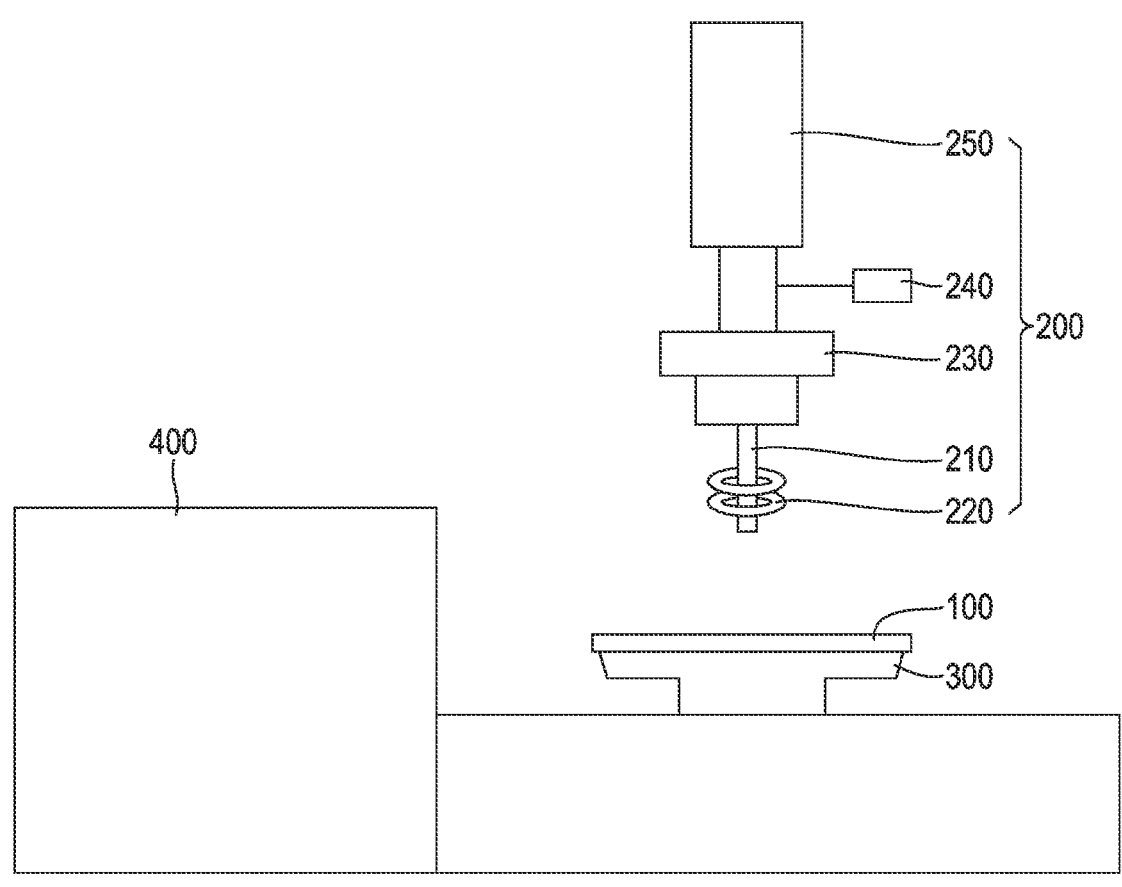
FIG. 1 is a view schematically illustrating a glass panel heat chamfering apparatus according to some embodiments of the present disclosure.
FIG. 2 is a view schematically illustrating a glass panel heat chamfering method according to some embodiments of the present disclosure.

FIG. 1 is a view schematically illustrating a glass panel heat chamfering apparatus according to some embodiments of the present disclosure.

In some embodiments, the heat chamfering apparatus may include a head unit 200, a support unit 300, and a control unit 400.

The head unit 200 may include a heater able to apply thermal shock to an edge of a glass panel 100 by heating the edge of the glass panel 100. In some embodiments, the heater may include a hot body 210 and an induction coil 220 heating the hot body 210 by high frequency induction heating.

In some embodiments, the head unit 200 may include a heat insulator 230. The heat insulator 230 may block heat generated by the heater from being transferred to the remaining portions of the head unit 200. In addition, the head unit 200 may include a cooler (not shown) for rapidly dissipating heat generated by the heater through heat exchange.

In some embodiments, the head unit 200 may include a pressure sensor 240. The pressure sensor 240 may detect contact pressure between the heater and the glass panel 100. In some embodiments, as the glass panel 100 is moved into contact with the heater while being movably supported, the heater is pushed, and the pressure sensor 240 may measure a distance by which the heater is moved, convert the distance into a pressure value, and display a numerical value of the pressure value. The pressure sensor 240 may be a digital sensor. Unlike an analog pressure sensor, the digital sensor pressure sensor enables active control to compensate for a change in the contact pressure between the heater and the glass panel 100 in real time during a heat chamfering process.

In some embodiments, the head unit 200 may include a driver 250. The driver 250 is a component that moves at least one of the heater and the support unit 300.

In some embodiments, the head unit 200 may include a distance measuring sensor (not shown), such as a laser distance measuring sensor.

The support unit 300 is a component holding the glass panel 100 while heat chamfering is being performed. In embodiments in which the glass panel 100 is held at a fixed position during heat chamfering, the support unit 300 may maintain the glass panel 100 at a fixed position by holding the glass panel 100. In contrast, in embodiments in which the glass panel 100 is moved during heat chamfering, the support unit 300 may move the glass panel 100 while holding the glass panel 100.

The control unit 400 may receive values read by the pressure sensor 240, the distance measurement sensor, and the like and control the driver 250 on the basis of these values.

FIG. 2 is a view schematically illustrating a glass panel heat chamfering method according to some embodiments of the present disclosure.

It is possible to heat-chamfer an edge of the glass panel 100 by applying thermal shock thereto. The thermal shock may be caused by the difference between the temperature of the edge of the glass panel 100 heated by the heater and the remaining portion of the glass panel 100.

In some embodiments, the glass panel 100 may include a glass substrate and a device provided on the glass substrate. For example, the glass panel 100 may be a glass panel in which a transparent electrode, an organic light emitting layer, metal electrodes, and an encapsulation layer are provided on a glass substrate.

In some embodiments, the edge of the glass panel 100 may be peeled by relatively moving the heater along the edge of the glass panel 100 while maintaining the heater in contact with the edge of the glass panel 100. Due to this chamfering, a strip 100a may be peeled off from the edge of the glass panel 100. Due to this chamfering, a thin strip 100*a* may be peeled off from the glass panel 100 without causing particles, thereby removing a defect in the edge of the glass panel 100 and improving the strength of the glass panel 100.

For the relative movement, the glass panel 100 may be moved, the heater may be moved, or both the glass panel 100 and the heater may be moved. FIG. 2 illustrates an embodiment in which the glass panel 100 is moved (an arrow indicates the movement direction of the glass panel 100), whereas FIGS. 3 to 6 illustrate an embodiment in which the hot body 210 is moved (arrows indicate the movement direction of the hot body 210).

The relative movement speed may vary depending on the temperature conditions, the composition and the shape of the glass panel 100 to be chamfered, and the like. In some embodiments, the relative movement speed may range from 5 mm/s to 20 mm/s (in particular, 10 mm/s to 15 mm/s) for a linear edge section, 10 mm/s to 30 mm/s (in particular, 15 mm/s to 20 mm/s) for a concave edge section, and 5 mm/s to 15 mm/s (in particular, 7 mm/s to 10 mm/s) for a convex edge section.

The glass panel 100 according to the present disclosure may include panels formed from any glass material (e.g., borosilicate glass). The main plane of the glass panel 100 may have a rectangular shape, but the glass panel 100 is not limited to a specific shape, such as a polygon, a circle, or an ellipse. In the present disclosure, the glass panel 100 may be a sheet having a thickness (e.g., the measurement in the Z-axis direction) smaller than either the transverse length (e.g., the measurement in the X-axis direction) and the longitudinal length (e.g., the measurement in the Y-axis direction) of the main plane. However, the present disclosure is not limited thereto, and the glass panel 100 may have a variety of shapes, such as a thick block.

For example, when the main plane of the glass panel 100 has a rectangular shape and the main plane of the glass panel is referred to as an X-Y plane, the heater may perform chamfering by relatively moving in the X-direction and the Y-direction while being in contact with four edges of the glass panel 100.

In some embodiments, the heater may perform the chamfering while being continuously in contact with the four edges of the glass panel 100. For example, when the four edges of the glass panel 100 are referred to as a first edge, a second edge, a third edge, and a fourth edge in the clockwise direction, the heater may chamfer all of the four edges of the glass panel 100 by relatively moving in the X-axis direction until contacting the corner between the first edge and the second edge while being in contact with the first edge, relatively moving in the Y-axis direction until contacting the corner between the second edge and the third edge while being in contact with the second edge, relatively moving in a direction opposite the X-axis direction until contacting the corner between the third edge and the fourth edge while being in contact with the third edge, and then, relatively moving in a direction opposite the Y-axis direction until contacting the corner between the fourth edge and the first edge while being in contact with the fourth edge.

The heat chamfering method may include: bringing the heater into contact with the glass panel 100 by causing the heater to approach a chamfering start point by relative movement between the heater and the glass panel 100; heat-chamfering the edge of the glass panel 100 by moving the heater from the chamfering start point to a chamfering end point along a chamfering line by relative movement between the heater and the glass panel 100; and separating the heater from the glass panel 100 by causing the heater to depart from the chamfering end point by relative movement between the heater and the glass panel 100. The chamfering line may be substantially parallel to the edge of the glass panel 100, while the start point of the chamfering line is the chamfering start point and the end point of the chamfering line is the chamfering end point.

Here, the chamfering start point, the chamfering end point, and the chamfering line may be defined by a track drawn by a specific point of the heater. For example, in a case in which a center point of the heater at a point in time at which the heater comes into contact with the glass panel 100 is referred to as the chamfering start point, a center point of the heater at a point in time at which the heater is separated from the glass panel 100 may be referred to as the chamfering end point. In addition, a track along which the center point of the heater moves during the chamfering may be referred to as the chamfering line.

The contact pressure between the heater and the edge of the glass panel 100 during the heat chamfering is a very important factor that has an effect on the quality of the heat chamfering. Thus, it is necessary to monitor and actively control this pressure to have an appropriate value. In this manner, the heat chamfering may be performed reliably at a high yield.

To obtain a predetermined peeling width, during the relative movement between the hot body 210 and the glass panel 100 along the chamfering line, the relative position between the glass panel 100 and the hot body 210 may be controlled so that a change in the contact pressure between the hot body 210 and the glass panel 100 is maintained within a predetermined range of change. Here, the range of the change means the difference between a maximum allowable pressure and a minimum allowable pressure. For example, when the contact pressure is maintained within the range from 0.1 kgf/cm$^2$ to 1 kgf/cm$^2$, the range of the change is: 1 kgf/cm$^2$-0.1 kgf/cm$^2$=0.9 kgf/cm$^2$, i.e., ±$^{0.45}$ kgf/cm$^2$. When the contact pressure is too low, the heat chamfering is not enabled. Thus, the heat chamfering may be discontinuous at this point. In contrast, when the contact pressure is too high, the thickness of the strip 100*a* peeled off by the chamfering may be too thick, thereby increasing the dimensional loss of a final product. In some embodiments, the range of the change in the contact pressure may be 0.9 kgf/cm$^2$, i.e., ±0.45 kgf/cm$^2$.

In some embodiments, the heater may be moved to approach the chamfering start point so that the contact pressure between the heater and the glass panel 100 having a thickness of 0.5 mm or less, for example, 0.1 mm, ranges from 0.1 kgf/cm$^2$ to 1.0 kgf/cm$^2$ at the chamfering start point. In some of such embodiments, the heater may be moved to approach the edge of the glass panel 100 until reaching the chamfering start point so that the contact pressure ranges from 0.2 kgf/cm$^2$ to 0.5 kgf/cm$^2$. In some of such embodiments, the heater may be moved to approach the edge of the glass panel 100 until reaching the chamfering start point so that the contact pressure is 0.2 kgf/cm$^2$.

First, it is necessary to sense the contact pressure in order to set an initial value for the heat chamfering and to maintain optimal contact pressure during the entirety of the heat chamfering process. In some embodiments, the contact pressure may be maintained to be constant by measuring the value of the contact pressure in real time using a digital pressure sensor and adjusting the relative position of the heater with respect to the glass panel 100 on the basis of the measured value of the contact pressure by feedback control.

The relative position between the glass panel 100 and the hot body 210 may be adjusted depending on the radius of the hot body 210. When the hot body 210 having a greater radius is used, the relative position between the glass panel 100 and (the central axis of) the hot body 210 may be increased, thereby maintaining the contact pressure to be constant. When the hot body 210 having a smaller radius is used, the relative position between the glass panel 100 and (the central axis of) the hot body 210 may be reduced, thereby maintaining the contact pressure to be constant.

In some embodiments, in the glass panel 100 having a thickness 0.5 mm or less, for example, 0.1 mm, the peeling width may range from 100 μm to 400 μm. That is, the edge of the glass panel 100 after the chamfering may be formed to be located inside the edge of the glass panel 100 before the chamfering, by 100 μm to 400 μm. In some embodiments, the peeling width may be 200 μm. The peeling width ranging from 100 μm to 400 μm may be obtained by performing the heat chamfering by bringing the heater having optimal temperature into contact with the glass panel 100 with optimal contact pressure. The optimal temperature and the optimal contact pressure may be controlled to be continuously maintained during the heat chamfering. Consequently, the heat chamfering may be performed with a predetermined peeling width. The peeling width may vary depending on whether a portion of the edge of the glass panel 100 is in a linear section or a corner section. In some embodiments, when the glass panel 100 formed from EXG, Lotus, or IRIS glass available from Corning Incorporated is heat-chamfered, the temperature of the hot body 210 may be a value obtained by summing the glass transition temperature of the glass panel 100 and 300° C. to 700° C. (in particular, 500° C. to 600° C.).

FIG. 3 is a view illustrating an approach angle at which the heater approaches a glass panel and a departure angle at which the heater is separated from the glass panel.

In some embodiments, the heater (i.e., hot body 210) may approach a chamfering start point P1 so that an angle ranging from 155° to 175° (in particular, 160° to) 170°) is defined by an approach line L1 of the heater and a chamfering line L2. In some embodiments, the heater may depart from a chamfering end point P3 so that an angle ranging from 155° to 175° (in particular, 160° to) 170° is defined by the chamfering line L2 of the heater and a departure line L3. An approach angle Θ1 and a departure angle Θ3 within the range assist in obtaining a final shape of the chamfered glass panel required at the chamfering start point P1 and the chamfering end point P3.

As described above, when the chamfering start point P1, the chamfering end point P3, and the chamfering line L2 are defined in relation to any specific point of the heater, the approach angle Θ1 and the departure angle Θ3 may also be defined in relation to the specific point of the heater. For example, an angle between the direction of progress of, for example, the center point of the heater at a moment immediately before the heater reaches the chamfering start point P1 and the direction of progress of the center point of the heater at a moment just after the heater reaches the chamfering start point P1 may be defined as the approach angle Θ1. In addition, an angle between the direction of progress of, for example, the center point of the heater at a moment just before the heater reaches the chamfering end point P3 and the direction of progress of the center point of the heater at a moment just after the heater reaches the chamfering end point P3 may be defined as the departure angle Θ3.

Figure 5:
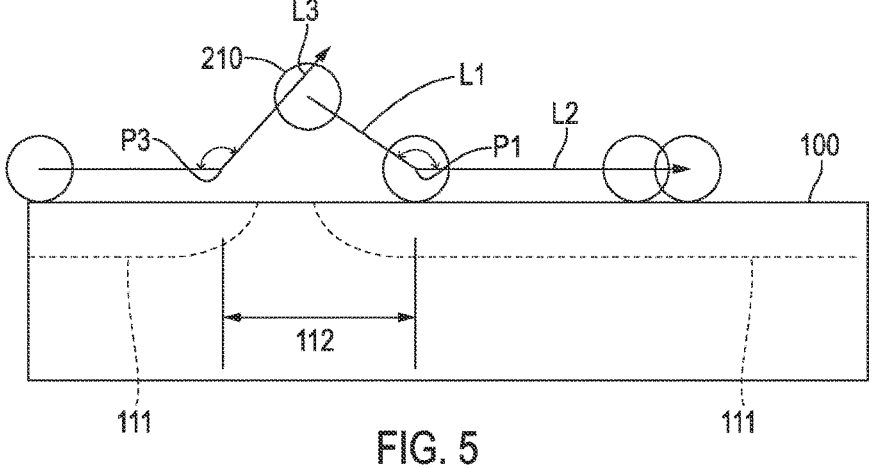
Figure 6:
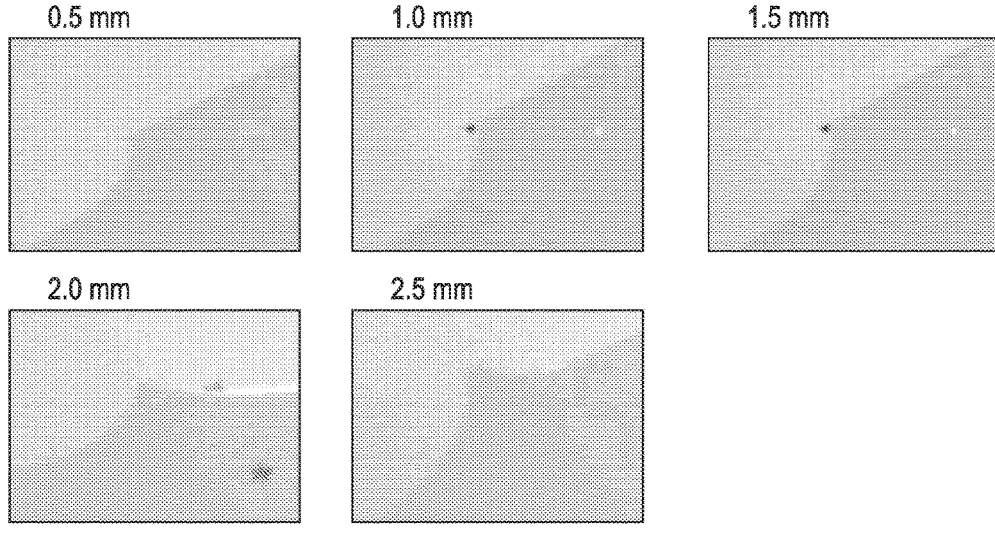
FIG. 6 is a view illustrating effects according to the size of the gap between the chamfering end point and the chamfering start point.

FIGS. 4 and 5 are views illustrating a gap between the chamfering end point and the chamfering start point, and FIG. 6 is a view illustrating effects according to the size of the gap between the chamfering end point and the chamfering start point.

Before the heater (i.e. the hot body 210) returns to the chamfering start point P1, the heater may depart from the chamfering end point P3, thereby being separated from the glass panel 100. In some embodiments, the distance between the chamfering end point P3 and the chamfering start point P1 may range from 1 mm to 3 mm (in particular, 1.5 mm to 2.5 mm). In some of such embodiments, the distance between the chamfering end point P3 and the chamfering start point P1 may be 2 mm. The heat chamfering may be performed without causing defects by adjusting the distance as well as parameters, such as temperature and pressure. In some of such embodiments, the distance between the chamfering end point P3 and the chamfering start point P1 may be 2 mm. When the size of a gap 112 between the chamfering end point P3 and the chamfering start point P1 is too small, an excessively sharp portion of the edge 111 of the chamfered glass panel may be created. When the size of a gap 112 is too large, a portion of the edge not chamfered may be increased.

Aspect (1) of this disclosure pertains to a heat chamfering method for a glass panel, the method comprising: bringing a heater into contact with an edge of a glass panel by causing the heater to approach a chamfering start point by relative movement between the heater and the glass panel; heat-chamfering the edge of the glass panel by applying thermal shock thereto while causing the heater to move from the chamfering start point to a chamfering end point along a chamfering line by relative movement between the heater and the glass panel; and bringing the heater into non-contact with the glass panel by causing the heater to depart from the chamfering end point by relative movement between the heater and the glass panel, wherein the heat-chamfering comprises controlling a relative position between the glass panel and the heater such that contact pressure between the glass panel and the heater is maintained during the relative movement between the heater and the glass panel along the chamfering line.

Aspect (2) of this disclosure pertains to the heat chamfering method of Aspect (1), wherein a change in the contact pressure between the heater and the glass panel is maintained within a predetermined range during the relative movement between the heater and the glass panel along the chamfering line.

Aspect (3) of this disclosure pertains to the heat chamfering method of Aspect (2), wherein the predetermined range is ±0.45 kgf/cm².

Aspect (4) of this disclosure pertains to the heat chamfering method of Aspect (2) or Aspect (3), wherein the change in the contact pressure between the heater and the glass panel is maintained within the predetermined range by maintaining the contact pressure between the heater and the glass panel within a range of 0.1 kgf/cm² to 1.0 kgf/cm².

Aspect (5) of this disclosure pertains to the heat chamfering method of Aspect (4), wherein the change in the contact pressure between the heater and the glass panel is maintained within the predetermined range by maintaining the contact pressure between the heater and the glass panel within a range of 0.2 kgf/cm² to 0.5 kgf/cm².

Aspect (6) of this disclosure pertains to the heat chamfering method of any one of Aspects (1) through (5), wherein the change in the contact pressure between the heater and the glass panel is maintained within the predetermined range by measuring a value of the contact pressure in real time using a sensor and feedback-controlling the relative position of the heater with respect to the glass panel in accordance with the measured value of the contact pressure.

Aspect (7) of this disclosure pertains to a heat chamfering method for a glass panel, the method comprising: bringing a heater into contact with an edge of a glass panel by causing the heater to approach a chamfering start point by relative movement between the heater and the glass panel; heat-chamfering the edge of the glass panel by applying thermal shock thereto while causing the heater to move from the chamfering start point to a chamfering end point along a chamfering line by relative movement between the heater and the glass panel; and bringing the heater into non-contact with the glass panel by causing the heater to depart from the chamfering end point by relative movement between the heater and the glass panel, wherein the heater approaches the chamfering start point such that an angle defined by an approach line, along which the heater approaches the chamfering start point, and the chamfering line at the chamfering start point ranges from 155° to 175°, and the heater departs from the chamfering end point such that an angle defined by the chamfering line and a departure line, along which the heater departs from the chamfering end point, ranges from 155° to 175°.

Aspect (8) of this disclosure pertains to the heat chamfering method of Aspect (7), wherein the heater approaches the chamfering start point such that the angle defined by the approach line and the chamfering line at the chamfering start point ranges from 160° to 170°, and the heater departs from the chamfering end point such that the angle defined by the chamfering line and the departure line ranges from 160° to 170°.

Aspect (9) of this disclosure pertains to a heat chamfering method for a glass panel, the method comprising: bringing a heater into contact with an edge of a glass panel by causing the heater to approach a chamfering start point by relative movement between the heater and the glass panel; heat-chamfering the edge of the glass panel by applying thermal shock thereto while causing the heater to move from the chamfering start point to a chamfering end point along a chamfering line by relative movement between the heater and the glass panel; and bringing the heater into non-contact with the glass panel by causing the heater to depart from the chamfering end point before the heater returns to the chamfering start point by relative movement between the heater and the glass panel, wherein a distance between the chamfering end point and the chamfering start point ranges from 1 mm to 3 mm.

Aspect (10) of this disclosure pertains to the heat chamfering method of Aspect (9), wherein the distance between the chamfering end point and the chamfering start point ranges from 1.5 mm to 2.5 mm.

Aspect (11) of this disclosure pertains to the heat chamfering method of any one of Aspects (1) through (10), wherein the thickness of the glass panel is 0.5 mm or less.

Aspect (12) of this disclosure pertains to the heat chamfering method of any one of Aspects (1) through (10), wherein the heater comprises: a hot body configured to chamfer the edge of the glass panel by applying thermal shock thereto while being in contact with the edge of the glass panel; and an induction coil configured to heat the hot body by induction heating.

Aspect (13) of this disclosure pertains to a heat chamfering apparatus for a glass panel, the heat chamfering apparatus comprising: a support unit configured to support a glass panel; a heater configured to heat-chamfer an edge of the glass panel by contact with the edge of the glass panel; and a control unit, wherein the control unit performs:

10 relatively moving the heater and the glass panel such that the heater approaches a chamfering start point to come into contact with the edge of the glass panel; relatively moving the heater and the glass panel such that the heater heat-chamfers the edge of the glass panel by applying thermal shock thereto while moving from the chamfering start point to a chamfering end point along a chamfering line; and relatively moving the heater and the glass panel such that the heater departs from the chamfering end point, thereby coming into non-contact with the glass panel, and the control unit controls a relative position between the glass panel and the heater such that a contact pressure between the heater and the glass panel is maintained while the heater is being moved from the chamfering start point to the chamfering end point along the chamfering line.

Aspect (14) of this disclosure pertains to a heat chamfering apparatus for a glass panel, the heat chamfering apparatus comprising: a support unit configured to support a glass panel; a heater configured to heat-chamfer an edge of the glass panel by contact with the edge of the glass panel; and a control unit, wherein the control unit performs: relatively moving the heater and the glass panel such that the heater approaches a chamfering start point along an approach line to come into contact with the edge of the glass panel; relatively moving the heater and the glass panel such that the heater heat-chamfers the edge of the glass panel by applying thermal shock thereto while moving from the chamfering start point to a chamfering end point along a chamfering line; and relatively moving the heater and the glass panel such that the heater departs from the chamfering end point along a departure line, thereby coming into non-contact with the glass panel, and wherein the control unit controls: the heater to approach the chamfering start point such that an angle defined by the approach line and the chamfering line at the chamfering start point ranges from 155° to 175°, and the heater to depart from the chamfering end point such that an angle defined by the chamfering line and the departure line ranges from 155° to 175°.

Aspect (15) of this disclosure pertains to a heat chamfering apparatus for a glass panel, the heat chamfering apparatus comprising: a support unit configured to support a glass panel; a heater configured to heat-chamfer an edge of the glass panel by contact with the edge of the glass panel; and a control unit, wherein the control unit controls: the heater and the glass panel to relatively move such that the heater approaches a chamfering start point to come into contact with the edge of the glass panel; the heater and the glass panel to relatively move such that the heater heat-chamfers the edge of the glass panel by applying thermal shock thereto while moving from the chamfering start point to a chamfering end point along a chamfering line; and the heater and the glass panel to relatively move such that the heater departs from the chamfering end point, thereby coming into non-contact with the glass panel, before the heater returns to the chamfering start point, and wherein a distance between the chamfering end point and the chamfering start point ranges from 1 mm to 3 mm.

The present disclosure is not limited to the foregoing embodiments described above and illustrated in the drawings. Rather, a person having ordinary skill in the art will appreciate that various modifications and changes are possible without departing from the scope of the appended claims. The features described in individual claims may be combined unless explicitly described to the contrary. For example, even when two dependent claims refer to an independent claim only, a heat chamfering apparatus or a heat chamfering method according to a specific embodiment of the present disclosure may include all of the features of the two dependent claims.

What is claimed is:

1. A heat chamfering method for a glass panel, the method comprising:

bringing a heater into contact with an edge of a glass panel by causing the heater to approach a chamfering start point by relative movement between the heater and the glass panel;

heat-chamfering the edge of the glass panel by applying thermal shock thereto while causing the heater to move from the chamfering start point to a chamfering end point along a chamfering line by relative movement between the heater and the glass panel; and bringing the heater into non-contact with the glass panel by causing the heater to depart from the chamfering end point by relative movement between the heater and the glass panel, wherein the heat-chamfering comprises controlling a relative position between the glass panel and the heater such that contact pressure between the glass panel and the heater is maintained during the relative movement between the heater and the glass panel along the chamfering line, wherein the heater approaches the chamfering start point such that an angle defined by an approach line, along which the heater approaches the chamfering start point, and the chamfering line at the chamfering start point ranges from 155° to 175°, and the heater departs from the chamfering end point such that an angle defined by the chamfering line and a departure line, along which the heater departs from the chamfering end point, ranges from 155° to 175°.

2. The heat chamfering method of claim 1, wherein a change in the contact pressure between the heater and the glass panel is maintained within a predetermined range during the relative movement between the heater and the glass panel along the chamfering line.

3. The heat chamfering method of claim 2, wherein the predetermined range is ±0.45 kgf/cm².

4. The heat chamfering method of claim 2, wherein the change in the contact pressure between the heater and the glass panel is maintained within the predetermined range by maintaining the contact pressure between the heater and the glass panel within a range of 0.1 kgf/cm² to 1.0 kgf/cm².

5. The heat chamfering method of claim 4, wherein the change in the contact pressure between the heater and the glass panel is maintained within the predetermined range by maintaining the contact pressure between the heater and the glass panel within a range of 0.2 kgf/cm² to 0.5 kgf/cm².

6. The heat chamfering method of claim 1, wherein the change in the contact pressure between the heater and the glass panel is maintained within the predetermined range by measuring a value of the contact pressure in real time using a sensor and feedback-controlling the relative position of the heater with respect to the glass panel in accordance with the measured value of the contact pressure.

7. The heat chamfering method of claim 1, wherein the thickness of the glass panel is 0.5 mm or less.

8. The heat chamfering method of claim 1, wherein the heater comprises:

a hot body configured to chamfer the edge of the glass panel by applying thermal shock thereto while being in contact with the edge of the glass panel; and an induction coil configured to heat the hot body by induction heating.

9. A heat chamfering method for a glass panel, the method comprising:

bringing a heater into contact with an edge of a glass panel by causing the heater to approach a chamfering start point by relative movement between the heater and the glass panel;

heat-chamfering the edge of the glass panel by applying thermal shock thereto while causing the heater to move from the chamfering start point to a chamfering end point along a chamfering line by relative movement between the heater and the glass panel; and bringing the heater into non-contact with the glass panel by causing the heater to depart from the chamfering end point by relative movement between the heater and the glass panel, wherein the heater approaches the chamfering start point such that an angle defined by an approach line, along which the heater approaches the chamfering start point, and the chamfering line at the chamfering start point ranges from 155° to 175°, and the heater departs from the chamfering end point such that an angle defined by the chamfering line and a departure line, along which the heater departs from the chamfering end point, ranges from 155° to 175°.

10. The heat chamfering method of claim 9, wherein the heater approaches the chamfering start point such that the angle defined by the approach line and the chamfering line at the chamfering start point ranges from 160° to 170°, and the heater departs from the chamfering end point such that the angle defined by the chamfering line and the departure line ranges from 160° to 170°.

11. The heat chamfering method of claim 9, wherein the thickness of the glass panel is 0.5 mm or less.

12. The heat chamfering method of claim 9, wherein the heater comprises:

a hot body configured to chamfer the edge of the glass panel by applying thermal shock thereto while being in contact with the edge of the glass panel; and an induction coil configured to heat the hot body by induction heating.

13. A heat chamfering apparatus for a glass panel, the heat chamfering apparatus comprising:

a support unit configured to support a glass panel;

a heater configured to heat-chamfer an edge of the glass panel by contact with the edge of the glass panel; and a control unit, wherein the control unit performs:

relatively moving the heater and the glass panel such that the heater approaches a chamfering start point to come into contact with the edge of the glass panel, wherein the heater approaches the chamfering start point such that an angle defined by an approach line, along which the heater approaches the chamfering start point, and the chamfering line at the chamfering start point ranges from 155° to 175°;

relatively moving the heater and the glass panel such that the heater heat-chamfers the edge of the glass panel by applying thermal shock thereto while moving from the chamfering start point to a chamfering end point along a chamfering line; and relatively moving the heater and the glass panel such that the heater departs from the chamfering end point, thereby coming into non-contact with the glass panel, wherein the heater departs from the chamfering end point such that an angle defined by the chamfering line and a departure line, along which the heater departs from the chamfering end point, ranges from 155° to 175°, and the control unit controls a relative position between the glass panel and the heater such that a contact pressure between the heater and the glass panel is maintained while the heater is being moved from the chamfering start point to the chamfering end point along the chamfering line.

\* \* \* \* \*